J. T. Buell,
Fish Hook,
Nº 10,771. Patented Apr. 11, 1854.
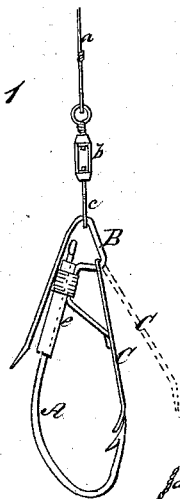
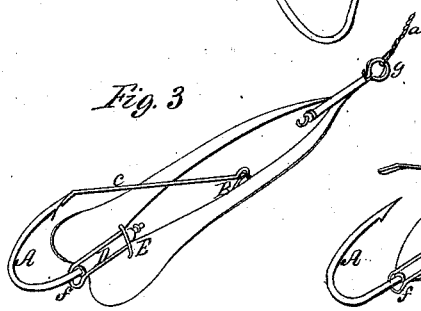
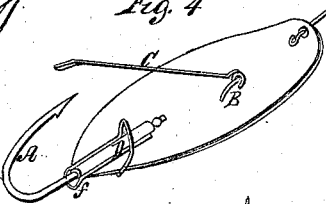
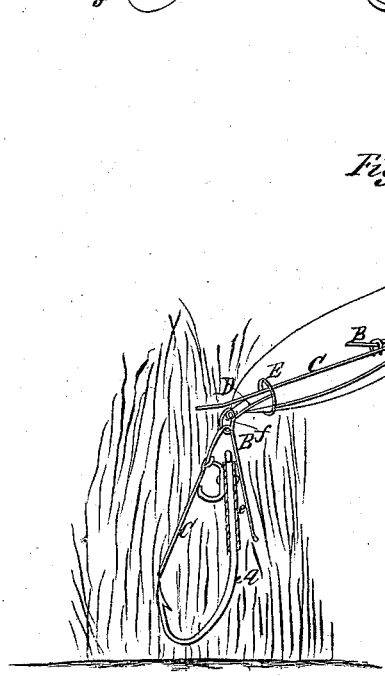
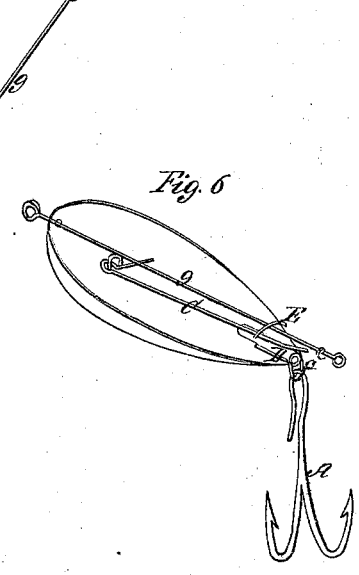

UNITED STATES PATENT OFFICE.

JULIO T. BUEL, OF WHITEHALL, NEW YORK.

IMPROVED ATTACHMENT FOR FISH-HOOKS AND ARTIFICIAL BAITS.

Specification forming part of Letters Patent No. 10,771, dated April 11, 1854.

*To all whom it may concern:*

Be it known that I, JULIO T. BUEL, of Whitehall, in the county of Washington and State of New York, have invented a new and useful Attachment for Fish-Hooks and Artificial Baits, whereby the points of hooks can be perfectly protected while trolling or fishing among weeds without interfering with their action; and I do hereby declare that the following is a full, clear, and exact description of the same, reference being had to the accompanying drawings, forming part of this specification, in which—

Figure 1 represents my improvements applied to a hook, which is attached to the line by means of a swivel and provided with a suitable bait, or which may be applied with ease and convenience to an artificial spinning or spoon bait constructed after my plan and having my spring-protection already applied to it. In this view the red lines represent the position which the spring-protection assumes when the fish takes hold of the hook and pulls downward. Fig. 2 shows a front view of the same, the spring-protection being shown in black lines as placed against the point of the hook and in red lines in the position it assumes when the fish strikes the hook and moves it in a horizontal line to the right. Fig. 3 is a perspective view of a spinning bait with my improvements applied to it. In this view only one hook is shown secured to the bait, and the spring-protection is shown set against the point of the hook. Fig. 4 is a perspective view of a spoon-bait with my improvements applied to it. In this view the spring-protection is shown out of operation. Fig. 5 shows the hook and spring-protection represented in Fig. 1 attached to a spoon-minnow. This view illustrates plainly the object of my invention. Fig. 6 is a perspective view of a spoon-minnow having two hooks attached to it. This view shows the manner in which the device for protecting the hook and the eye-link, which connects the line with the artificial bait, can be placed out of the way, so as not to take up much room when not in use.

Similar letters of reference in each of the several figures indicate corresponding parts.

My invention relates to a simple and useful device for preventing the points of fish-hooks catching in snags and weeds while trolling, said device consisting of a small spring-rod, which is attached loosely to a hook or artificial bait, and provided with a stay or support for it to rest and bear upon while sprung against the inner side of the point of the hook, the said spring, by reason of its elasticity, remaining in connection with the point of the hook until it is struck by a fish, when it disconnects itself from the point of the hook and allows it to perform its duty. To thus protect the hook, as every sportsman is well aware, is very important, for very often long delay, with much annoyance and trouble, is occasioned by the point of the hook catching in snags and weeds, and in many instances the sportsman loses his line, it being impossible to get the hook loose from the snag.

My invention relates, secondly, to a simple device for retaining the said protection-spring in place and out of the way when not in use, said device consisting of a spring-catch attached to the concave side of the artificial bait.

My invention consists, thirdly, in providing the lower extremity of artificial baits with a tube which terminates in an eye, so that they may be used with a single or double hook and with or without the spring-protection, the tube serving for the shank of a single hook to be secured in, and the eye for a double hook.

A in Figs. 1 and 2 of the accompanying drawings represents a hook with my protection attachment applied to it. This hook is secured to the line $a$ by the swivel $b$, the eye $c$ of the swivel fitting in the eye of the stay or support B.

B is the support, and C is the protection-spring. The construction and arrangement of these parts are plainly shown in the drawings. The stay or support, as represented in Fig. 1, is provided with a tube, $e$, for the shank of the hook to fit and move freely in. The object in having the hook secured loose in the tube $e$ is that the spring-rod C may revolve when struck by a fish and disconnect itself from the point of the hook without any danger of being broken. This hook, with its spring-protection, may be attached to an artificial bait in the manner shown in Fig. 5, or it may be used separate from it, as shown in Figs. 1 and 2.

By examining Fig. 3 this protection device will be seen applied to a spinning bait, the shank of the hook A being secured in the tube D, and the spring C and stay B made in one piece and secured to the concave side of the bait. In this figure the manner in which the spring is set and made to bear against the inner side of the point of the hook will be clearly seen. The tube D, in which the hook is secured, terminates in an eye, $f$, as shown. This eye serves for a hook similar to that shown in Fig. 6 to be secured in. The line is attached to this bait in the manner shown.

E is the spring-catch for the spring C to lie under when not in use.

In Figs. 4, 5, and 6 the protection device is shown applied to a spoon-minnow in a similar manner as it is applied to the spinning bait, Fig. 5 showing the spring in connection with the point of the hook, Fig. 4 showing it out of connection, and Fig. 6 showing it and the eye-link $g$, to which the line is tied, laid under the spring-catch E. The hooks A may also be arranged under the catch when not in use.

It must be obvious that this simple attachment will perfectly effect the object desired; also, that it can be applied to almost every kind of hook in use to great advantage.

What I claim as my invention, and desire to secure by Letters Patent, is—

1. Preventing the points of fish-hooks catching in snags and weeds while trolling by means of a spring which is attached loosely to a hook or artificial bait and provided with a stay or support to rest or bear upon while sprung against the inner side of the point of the hook, the said spring, by reason of its elasticity, remaining in connection with the point of the hook until it is struck by a fish, when it disconnects itself from the point of the same and allows it to perform its duty, substantially as herein described.

2. Arranging a spring-catch on the concave side of an artificial bait for retaining the said protecting-spring in its place and out of the way when not in use, substantially as described.

3. Providing the lower extremity of artificial baits with a tube which terminates in an eye, so that they may be used with a single or double hook, and with or without the spring-protection, the tube serving for the shank of a single hook to be secured in, and the eye for a double hook, substantially as described.

JULIO T. BUEL.

Witnesses:
DENNIS JONES,
WILLIAM WHEELER.